Jan. 17, 1939.   R. C. HOWELL   2,143,983
INDUSTRIAL TRUCK
Filed Nov. 24, 1937   2 Sheets-Sheet 1
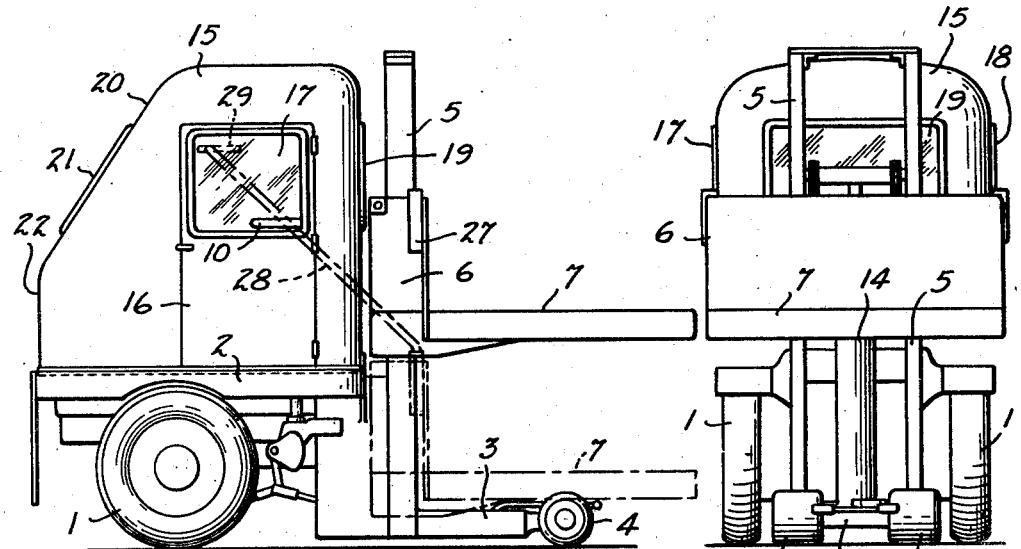
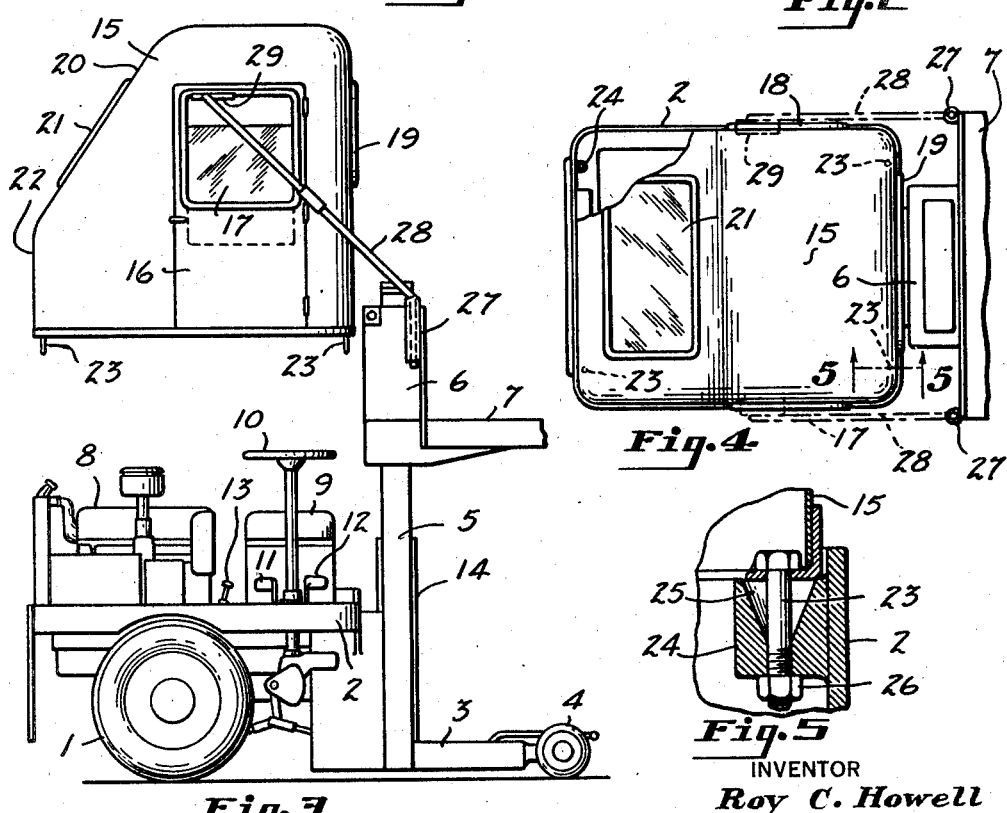
INVENTOR
Roy C. Howell
BY Frank S. Greene
ATTORNEY Jan. 17, 1939.  R. C. HOWELL  2,143,983
INDUSTRIAL TRUCK
Filed Nov. 24, 1937  2 Sheets-Sheet 2
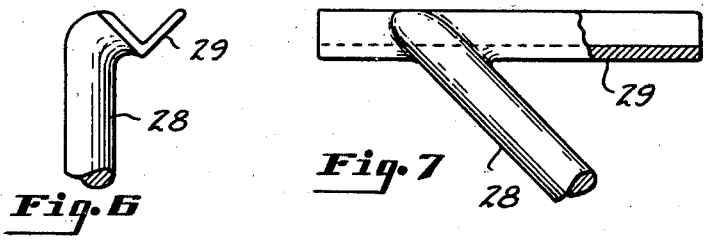
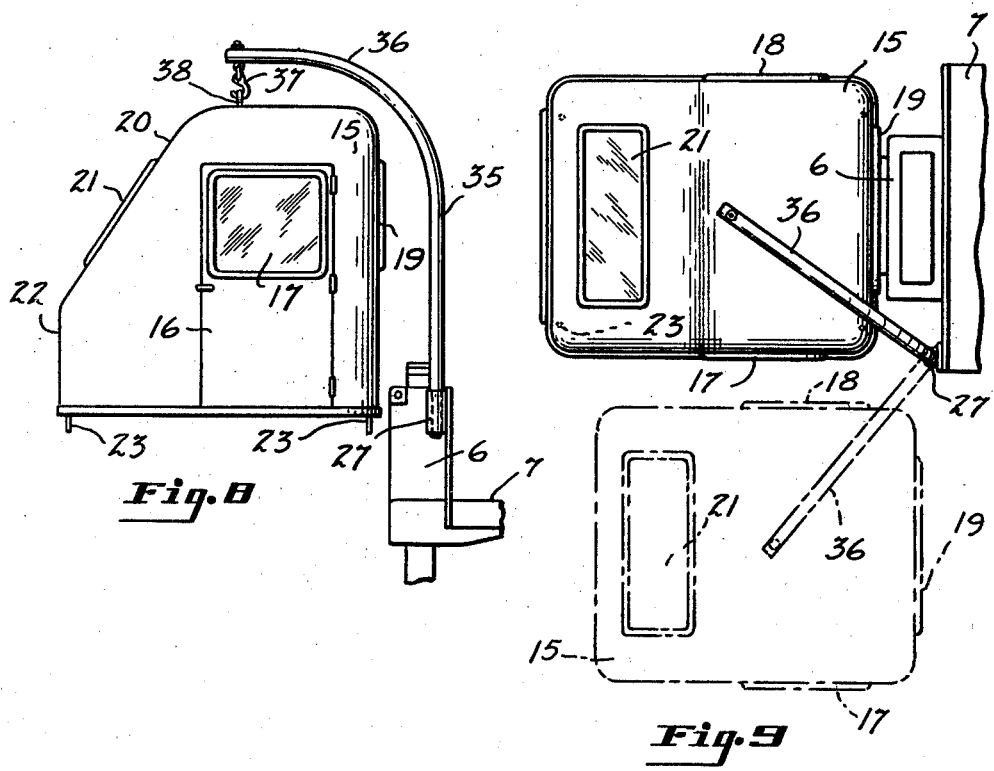
INVENTOR
Roy C. Howell
BY Frank S. Greene
ATTORNEY Patented Jan. 17, 1939

2,143,983

UNITED STATES PATENT OFFICE 2,143,983

INDUSTRIAL TRUCK

Roy C. Howell, Lakewood, Ohio

Application November 24, 1937, Serial No. 176,272

5 Claims. (Cl. 180—54)

This invention relates to power driven material handling devices and particularly to power driven industrial trucks provided with load lifting and carrying means and with an operator's platform which serves as a support for the motor, mechanism driven by the motor, and the usual vehicle and lift-controlling devices.

In power driven vehicles of the character referred to the motor and other mechanism on the operator's platform are ordinarily not covered and no protection against the weather is provided for the operator. Such trucks are commonly used out of doors and the operators of such trucks are subjected to severe hardships during inclement weather.

It is the object of the present invention to provide a means to protect the operator and also the mechanism on the operator's platform which will not interfere with operation of the truck nor with access to the mechanism for adjustments, replacements, or repairs.

The size of the operator's platform is ordinarily only sufficient to permit the mounting of the necessary mechanism thereon. For this reason very little space can be provided within any enclosure which may be provided for making the adjustments, replacements, or repairs which are from time to time necessary.

It is the object of the present invention to provide a cab which serves to house the motor, mechanisms operated by the motor, the controls for such motor which are on the operator's platform, and the operator, and to so mount the cab upon the platform that it can be easily shifted to a position such that free access may be had to all the mechanism on the platform.

A further object of the invention is to utilize the load-lifting mechanism of the truck to lift the cab off the platform to a position clear of the mechanism on the platform.

With the above and other objects in view, the invention may be said to comprise a truck as illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification, in which:

Figure 1 is a side elevation of a truck embodying the invention;

Fig. 2 is a front elevation of the truck;

Fig. 3 is a side elevation of the truck showing the cab in elevated position;

Fig. 4 is a top plan view of the cab;

Fig. 5 is a section on an enlarged scale taken on the line indicated at 5—5 in Fig. 4, showing the means for fastening the cab to the platform;

Fig. 6 is a fragmentary end elevation of the cab engaging upper end portion of an arm employed for lifting the cab;

Fig. 7 is a fragmentary side elevation of the upper end portion of the lifting arm;

Fig. 8 is a fragmentary side elevation showing a swivelled lifting arm which may be used to remove the cab from the truck;

Fig. 9 is a top plan view of a truck provided with the lifting arm shown in Fig. 8.

Referring to the accompanying drawings, the present invention is shown applied to an industrial truck provided with a pair of traction wheels 1 and a frame including a mechanism and operator-supporting platform 2 directly above the wheels 1 and a portion 3 rearwardly of the wheels 1 which is positioned closely adjacent the ground, small supporting wheels 4 being provided at the rear end of the portion 3 of the frame. A vertical guide 5 at the rear end of the platform 2 provides a rigid connection between the platform 2 and rearwardly extending portion 3 of the frame and also provides vertical ways for a carriage 6 to which is attached a lift platform 7, the carriage 6 being movable vertically from a position closely overlying the portion 3 of the frame, in which the platform 7 is closely adjacent the ground, to a position in which the platform 7 is elevated above the platform 2. The platform 2 provides a support for a driving motor 8, preferably an internal combustion engine such as commonly used for driving motor vehicles. Rearwardly of the engine 8 an operator's seat 9 is mounted on the platform. The seat 9 faces sidewise and in front of the seat there is a steering wheel 10, a brake pedal 11, a clutch pedal 12, and an accelerator pedal 13. The carriage 6 is raised and lowered by means of a hydraulic cylinder 14 which receives fluid under pressure from a pump driven by the engine 8 as is common practice in the art.

The industrial truck as so far described is of the conventional and usual construction, the usual change speed gears being provided for driving the truck at different speeds in either direction, the usual controls being provided convenient to the operator for operating the lift platform.

To provide an enclosure to protect the operator from the weather and to shelter the mechanism mounted on the platform 2, a cab 15 is provided which is of substantially the same size at its lower end as the platform upon which it is mounted, the cab being provided with door 16 through which ingress and egress is had from the cab. The door 16 is provided with a window 17 and the opposite side wall of the cab is provided with a similar window 18. The rear wall of the cab is provided with a wide window 19. The front wall of the cab is provided with an inclined upper portion 20 provided with a wide window 21 and with a vertical lower portion 22 which is formed to receive the radiator of the engine 8. The lower edges of the vertical walls of the cab rest upon the top of the platform 2 adjacent the edges thereof and the cab is provided with bolts 23 adjacent each of the four corners thereof which project downwardly below the bottom edges of the cab walls through apertures in the platform which are provided with metal sleeves 24 each of which has a lower portion of a diameter to receive a bolt 23 and upper conical recesses 25 which serve to guide the bolts 23 into place so as to automatically position the cab upon the platform when the cab is lowered into place on the platform. The cab is securely held in place on the platform by means of nuts 26 on the lower ends of the bolts 23.

A cab such as above described provides comfortable quarters for the operator, and protects the mechanism against the weather. The space within the cab, however, is very restricted, making it exceedingly difficult to make any adjustments, replacements, or repairs on the mechanism within the cab. In order to avoid this difficulty, means is provided by which the cab may be quickly and easily lifted clear of all the mechanism on the operator's platform.

As shown in Figs. 3 and 4, the carriage 6 is provided at each side thereof with a vertically disposed socket 27 each socket being adapted to receive the lower end of a lifting arm 28 which can swivel in the socket. The lifting arms 28 are in the form of rigid metal rods or bars which are inclined from adjacent the portion which fits in the sockets 27 to the upper ends thereof. Each arm 28 is provided at its upper end with a laterally offset V-shaped window rail engaging member 29 which is adapted to engage the top rails of the windows 17 and 18. When it is desired to obtain access to mechanism within the cab, the lifting arms 28 are placed in the sockets 27, the panes of windows 17 and 18 are lowered and the rail engaging portions 29 of the arms 28 are swung into the openings and engaged beneath the rails at the tops of the windows 17 and 18. The nuts 26 are removed from the bolts 23 and fluid under pressure is admitted to the cylinder 14 to raise the carriage 6. When the carriage 6 is raised, it carries the cab 15 with it, elevating the cab to a position far enough above the mechanism on the platform 2 to permit ready access to the mechanism as shown in Fig. 3 of the drawings. After the desired repairs or adjustments have been made the carriage 6 is lowered to bring the cab back down into engagement with the platform 2. As the lower edge of the cab approaches the platform the downwardly projecting bolts 23 enter the conical recesses 25 of the sleeves 24 and the cab is guided into proper position on the platform.

During some seasons of the year it may be preferred to dispense with the cab 15, and in order to facilitate the removal of the cab from the truck a single lifting arm 35 may be provided which is somewhat longer than the arms 28. The lifting arm 35 may be placed in socket 27 at one side of the carriage 6. The arm 35 is free to swivel in the socket 27 and has a laterally bent upper end 36 which is provided with a hook 37 adapted to engage in an eye 38 attached to the roof of the cab centrally thereof. The cab may be lifted bodily off the platform by elevating the carriage 6 and when so elevated may be swung laterally to a position clear of the truck as shown in Fig. 9. After swinging the cab clear of the truck the cab may be deposited on a suitable support at one side of the truck by lowering the carriage 6.

The present invention provides a cab of simple and durable construction which effectively protects the operator and the mechanism against the weather and which provides adequate vision in all directions and the provision of means for lifting the cab when desired eliminates the inconveniences which would be incident to the use of a permanently mounted cab.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An industrial truck comprising a wheeled vehicle having an operator's platform and a vertically movable lift platform beyond one end of the operator's platform, means for raising and lowering said lift platform, a motor on said operator's platform, mechanism operated by said motor for driving the vehicle and for operating said raising and lowering means, an operator's cab detachably mounted on said platform and providing a housing for the operator, the motor and mechanism operated by the motor, and means for connecting said cab to said lift platform for movement therewith, whereby said cab may be lifted to a position clear of said motor and mechanism.

2. An industrial truck comprising a wheeled vehicle having an operator's platform and a vertically movable lift platform beyond one end of the operator's platform, means for raising and lowering said lift platform, a motor on said operator's platform, mechanism operated by said motor for driving the vehicle and for operating said raising and lowering means, an operator's cab mounted on said platform, said cab comprising a roof, front, rear and side walls which provide a housing for the operator and motor, bolts carried by said walls at each corner of the cab and projecting downwardly from the lower edges of the walls, tapered apertures in said platform to receive said bolts, and means for connecting said cab to said lift platform for movement therewith whereby said cab may be lifted to a position clear of the motor.

3. An industrial truck comprising a supporting vehicle including a pair of traction wheels, said vehicle having an operator's platform above said traction wheels, a motor on said platform for driving said traction wheels, vehicle steering and motor controlling means carried by said platform, an operator's cab detachably mounted on said platform and providing a housing for the motor, the controlling and steering means and for the operator, a lift platform carried by the vehicle beyond one end of said operator's platform and movable from a position near the ground to a position above said operator's platform, and means including a lifting arm carried by the lift platform for lifting the cab off the operator's platform.

4. An industrial truck comprising a supporting vehicle including a pair of traction wheels, said vehicle having an operator's platform above said traction wheels, a motor on said platform for driving said traction wheels, vehicle steering and motor controlling means carried by said platform, an operator's cab detachably mounted on said platform and providing a housing for the motor, the controlling and steering means and for the operator, a vertical guide at one end of said platform, a carriage mounted for vertical movement on the guide means operated by the motor for actuating said carriage, a socket on each side of said carriage, and a lifting arm adapted to fit in each socket, each lifting arm having a laterally bent upper portion provided with a channel member at its outer end for engagement with the cab wall at the upper edge of a window opening in the cab.

5. An industrial truck comprising a supporting vehicle including a pair of traction wheels, said vehicle having an operator's platform above said traction wheels, a motor on said platform for driving said traction wheels, vehicle steering and motor controlling means carried by said platform, an operator's cab detachably mounted on said platform and providing a housing for the motor, the controlling and steering means and for the operator, a vertical guide at one end of said platform, a carriage mounted for vertical movement on the guide means operated by the motor for actuating said carriage, a vertically disposed socket on said carriage, and a lifting arm which has a rotating fit in said socket, said arm having a laterally extending upper end portion adapted to be connected to the top of the cab.

ROY C. HOWELL.